United States Patent
Antequera Rodriguez et al.

(10) Patent No.: US 8,746,363 B2
(45) Date of Patent: Jun. 10, 2014

(54) SYSTEM FOR CONDUCTING REMOTE BIOMETRIC OPERATIONS

(75) Inventors: Nicolás Antequera Rodriguez, Alcobendas (ES); Juan A. Lopez Ramos, Alcobendas (ES)

(73) Assignee: Hanscan IP B.V., Amsterdam (NL)

( * ) Notice: Subject to any disclaimer, the term of this patent is extended or adjusted under 35 U.S.C. 154(b) by 101 days.

(21) Appl. No.: 13/340,259

(22) Filed: Dec. 29, 2011

(65) Prior Publication Data

US 2012/0290832 A1 Nov. 15, 2012

(30) Foreign Application Priority Data

May 15, 2011 (EP) .................................... 11382113

(51) Int. Cl.
- *H04L 9/32* (2006.01)
- *H04L 9/00* (2006.01)
- *G06F 21/00* (2013.01)
- *G06F 7/04* (2006.01)

(52) U.S. Cl.
CPC .. *H04L 9/00* (2013.01); *H04L 9/32* (2013.01); *H04L 9/3231* (2013.01)
USPC ............... 173/155; 713/169; 713/182; 726/9; 726/20; 726/34

(58) Field of Classification Search
CPC ............ H04L 9/3231; H04L 9/00; H04L 9/32
See application file for complete search history.

(56) References Cited

U.S. PATENT DOCUMENTS

| 5,745,522 | A | * | 4/1998 | Heegard | 380/46 |
| 2002/0159589 | A1 | * | 10/2002 | She et al. | 380/37 |
| 2005/0010796 | A1 | * | 1/2005 | Arnouse | 713/200 |
| 2005/0139669 | A1 | * | 6/2005 | Arnouse | 235/440 |
| 2006/0168241 | A1 | * | 7/2006 | Puthiyandyil et al. | 709/227 |
| 2007/0180247 | A1 | * | 8/2007 | Leech | 713/171 |
| 2007/0250718 | A1 | * | 10/2007 | Lee et al. | 713/186 |
| 2007/0257105 | A1 | * | 11/2007 | Owen et al. | 235/380 |
| 2011/0246768 | A1 | * | 10/2011 | Mahmud et al. | 713/167 |

* cited by examiner

*Primary Examiner* — Cordelia Zecher
*Assistant Examiner* — Trang Doan
(74) *Attorney, Agent, or Firm* — Arent Fox LLP

(57) ABSTRACT

System for conducting remote biometric operations that includes a biometric data reading device connected to a personal computer and configured to send said encrypted data to a remote data authentication center for establishing a secure communications channel once the user identity has been verified by means of said biometric data. This invention refers to a remote biometric operations system that can be connected to a computer to carry out electronic banking and other similar operations with a certain degree of safety.

8 Claims, No Drawings

SYSTEM FOR CONDUCTING REMOTE BIOMETRIC OPERATIONS

This invention refers to a system for conducting remote biometric operations that can be connected to a computer to carry out electronic banking and other similar operations with a certain degree of security.

PRIOR STATE OF THE ART

Different remote operations systems are described in the state of the art. American patent US 2007/0245154 can be considered the most recent invention background and describes a system that encrypts and securely stores the biometric characteristics of an individual.

Document US 2003/0076962 describes a method for modifying the validity of a public key infrastructure (PKI) certificate. In accordance with the invention, the main advantage is that the user is not required to personally visit a registration or certifying authority; instead, he can do it on-line using his biometric characteristics.

Finally, European patent EP 1 693 982 describes a method for establishing a secure communications channel but it does not use any biometric information in its application.

DESCRIPTION OF THE INVENTION

The technical problem that this invention intends to solve is how to establish a secure communications channel between the user and the final destination based on a series of conditions or main characteristics that this invention satisfactorily resolves.

Thus, the system described in this invention includes a biometric device that can be connected to the user's personal computer, which is configured for carrying out on-line operations securely from any client location and using the USB standard to perform the connection.

The security requirements are absolute and this is why the indicated device includes hardware encryption methods as well as anti-tampering methods. Specifically, the hardware encryption means include biometric signal encryption and decryption means as well as a means for carrying out the transaction or movement, which also includes a means for storing, at least a table of randomly generated m keys; also, it includes means for generating routing sequences of said table of keys, which vary with time in order to determine a selected key using a routing descriptor; it also includes a means for generating a random seed to define the initial state of the routing descriptor; and a means for executing an encryption/decryption algorithm of said seed and of said message, and where said algorithm includes an XOR bit to bit operation with said key selected in order to generate a second encrypted/non encrypted message; all of this in a manner so that the random seed as well as the message that contains the digital information are encrypted/decrypted by the encrypting/decrypting unit in different manners throughout time.

The device is light weight and can be carried by the user and connected to any computer, public or private. Likewise, in its practical embodiment, the device is implemented using appropriate electronics for its function and is less expensive than other more complex systems.

The system is completed with a remote identification verification centre and the means for routing the request.

Throughout the description and claims, the word "encompasses" and its synonyms do not intend to exclude other technical characteristics, additions, components or steps. For experts in the field, other objectives, advantages and characteristics of this invention will in part be derived from the description and in part from placing the invention into practice. The following examples and drawings provide an illustration and are not intended to limit this invention. Additionally, this invention covers all the possible combinations of particular and preferred embodiments indicated herein.

DETAILED DESCRIPTION OF THE APPLICATION METHODS AND EXAMPLES

Logically, the system's main component is the biometric identification and data encryption device, which includes the following means for performing its function: (a) a first biometric acquisition means, which includes the biometric sensor and its controller; (b) a second life detection means; (c) a third signal processing and hardware encryption means; and (e) a fifth means for memory storage.

Biometric Acquisition Means.

It is a module comprised of a sensor and its controller. Also, the controller may contain the matching algorithm if at any time it may be considered better to carry out the identification in local. The communications between the acquisition means with the processing and encryption means is carried out using the RS232 serial communication protocol.

Life Detection Means.

The life detection means consist of a pulse detector and an optional oximeter detector and it also incorporates a thermopile. These means also include: (a) a sensors module; (b) a wide band filtering module between [0.1-20] Hz to remove direct current and high frequency noise; (c) a signal amplifier module with a gain between 100 and 1000; (d) and a control and signal adaptation logic.

The life detection will be controlled by the processing and encryption means and both means are connected through an AD converter with 10 bits of resolution.

In a particular embodiment of this invention, the life detection means are as described in document WO2010/034848 owned by this same requester.

Signal Processing and Encryption Hardware Means

In this practical embodiment, the physical implementation of these means is carried out in the device itself and allows communicating with a high level of security and with an almost absolute certainty that whoever does not possess an encryption/decryption unit certified by the remote data centre will not be able to access the transmitted information.

In this case, the signal processing and hardware encryption means are comprised of an encryption/decryption unit, which includes an input/output of biometric data, through which the information passes just as it was generated M (clear message) and the information after it has been encrypted M' (encrypted message), respectively; it also includes a ROM-FLASH type internal memory used for storing the encryption/decryption algorithm as well as the table of keys.

In accordance with a preferred embodiment of this invention, the list or table of keys is integrated by randomly generated in numbers of n bits. The routing sequence is obtained from a Linear Feedback Shift Register with k stages (each stage corresponds to a one bit bistable logic), with $2^k$ greater or equal to m and a filtering function B of order j defined by a Boolean function, which generates numbers between 1 and m as an output, with $j \leq \log_2(m)$. The aforementioned LFSR will be determined by a primitive polynomial A with a degree of k, which ensures that each and every one of the items in the list or table of keys in the encrypting/decrypting process throughout time are routed due to the fact that the polynomial used is primitive with a degree such that $2^k$ is greater than m and the filter function forces the selected numbers to be within the appropriate range, allowing some of the keys to repeat themselves during the single message encryption process. In the case that the table of keys is comprised of exactly a number m so that $j=\log_2(m)$, each and every one of the items of said list appear in the same routing.

To encrypt biometric data requires a hierarchical structuring of the data to achieve the security properties of this key; in particular, the size or length of the package must be substantially less than the size of the table of keys for example, if the size of the table of keys is m=1024 words, the size of the packages should not have a p size greater than 512 words. First of all, the original message M of any size is fragmented into a set of p packages ($P_0, P_1, \ldots, P_{p-2}, P_{p-1}$); each of a length I bytes, that correspond with the structures that are encrypted and transmitted independently; simultaneously, the packages are divided in b blocks ($B_0, B_1, \ldots, B_{b-1}$) of q words in length and n bits per word.

Afterwards, a head block is generated for each package $P_i$ that is encrypted and transmitted first, which contains information of a random seed (SL-SH), system signatures (FO-F4), destination and size of the package (IG-IU; LO-L4), called Transmission Control Block (TCB). At the end of package $P_j$, after blocks $B_0, \ldots, B_{b-1}$ that only contain information (corresponding to the message to be encrypted/decrypted), a final block FB is included, which contains information as well as checksum type transmission error check bits (sum of the number of bits or bytes in a transmission or file, which allows knowing if any loss or modification of information occurred).

The emitter synchronization stage begins once the TCB has been generated. In the following text, FEED represents the encrypted seed and $\overline{TCB}$ represents the encrypting of transmission control words, TCB. Also, the SEED[i], FEED[i], TCB[i], $\overline{TCB}$[i] symbols respectively represent the ith word of the seed, the encrypted seed, TCB and the encrypted TCB respectively.

A random number of k bits to be used as seed or initial state to the non-linear filter generator LFSR are generated by means of a RTC (Real Time Clock). By means of the non-linear B function, the LFSR states are used to generate a sequence of pseudo-random numbers between 1 and m, which indicate the positions in the table containing XOR operations with each one of words in the TCB, which generate the TCB encryption denoted by $\overline{TCB}$, as well as the rest of the words in the clear text message. Subsequently, the seed is divided into words of length n, adding zeros to the left of one of the words if required and by means of TCB predetermined k bits to be used once again as input to the LFSR which, by means of the B filter function, once again generates a series of table positions, whose items are XOR added to the words of the seed in order to produce the encryption of the seed. The number of words in which the seed is divided is exactly equal to the whole part of k/n. This way, we transmit a first encrypted message that corresponds with $\overline{TCB}$, where the k first bits comprise the encrypting of the seed used for encrypting the message.

The process of encrypting the original message that is to be sent is exactly the same as the TCB encryption; that is, an XOR sum is carried out of the block to block message words with the items in the table whose positions are determined by the routing descriptor, using as its initial state the seed (not encrypted) transmitted in encrypted TCB; once the package is completed, it is transmitted and the process is repeated with the next package; in other words, generating a new TCB, seed etc., and so on, successively until completing all the packages in the message.

In the particular case of wireless communications systems, preceding the header block (TCB), synchronism and hardware device signature words required for carrying out the synchronization between wireless units are transmitted. The rest of the process is the same as described above. In wireless communications, since there is a higher probability of errors occurring, FEC (Forward Error correction) methods are usually used, which introduce redundant information in order to improve the BER (Bit Error Ratio); in this case, each block that has already been encrypted with q words increases its size in r redundant words, which are automatically generated by the FEC algorithm and are transmitted and received transparent to the source information.

When the receiver receives an encrypted message, its synchronization stage begins. For this, it takes the $\overline{TCB}$ predetermined k bits to use them as LFSR input, generating in this way a sequence of table positions, whose items, XOR added with the words corresponding to the k first bits of $\overline{TCB}$ provide the LFSR seed used for encrypting the rest of the $\overline{TCB}$. Once said seed has been obtained, it is used a LFSR input, which by means of the non linear B filter function, produces a series of table positions, whose items XOR added with the rest of words in the $\overline{TCB}$ provides the original TCB.

Once the TCB is obtained and the necessary checks have been carried out, the message decrypting stage begins, which sequentially block to block and package to package is totally symmetric to the encrypting stage and generating the original message as an output.

A temporary encryption/decryption may be used to increase the level of security. The temporary encrypting procedure consists of reading the year, month, day, hour, minute, etc. in the RTC, and by means of a logic operation, generate a size T bits temporary key through which the seed will be modified by the XOR operation, the output of the non-linear B filter function or the source information directly by the XOR operation simultaneously with the table of keys and the temporary key.

Using the described means, if the length of the table of keys is sufficient and the election of the descriptor (polynomial A and function of filter B that determine the routing order of said table of keys) is adequate, a high degree of security is provided since if the table and the descriptor are secret, even by knowing the encryption algorithm, the only possible attack is by means of using "brute force"; in other words, trying all possible tables of keys, routing descriptors and seeds. Said attack cannot be carried out using current computer systems because it would take too long.

In accordance with a specific example, the internal memory of the microcontroller contains a list or table of keys comprised of randomly generated 1024 numbers of 8 bits as well as a linear feedback shift register circuit (LFSR) with 16 stages (as can be seen, $2^{16}$ is greater than 1024), and a filter function of the same defined by a function that selects the output of the ten first LFSR stages, producing in this way, pseudo-random numbers between 0 and 1023 or equivalently between 1 and 1024. Of the 2048 possible linear feedback circuits with 16 stages mentioned in the description, the one provided by primitive polynomial $A=1+x+x^2+x^8+x^{13}+x^{15}+x^{16}$ is used.

External Memory.

The device includes an external memory that communicates with the third means of processing and encryption using I2C protocol and will be controlled by it.

Physical Security Means.

The physical security means include a plurality of microswitches used for detecting torsion or manipulation of the USB device. Also, the entire internal electronic system of the device will be flooded with an Epoxy resin that will solidify and make internal manipulation extremely difficult. The micro-switches will immediately detect if the device is being manipulated by detecting the pressure exerted by the torsion of the solid block formed by the epoxy. A lithium battery will feed the security circuit to disable the central chip in case of attack. The activation circuit related with the micro-switches and the destruction of the corresponding information will be enabled in "low" so that the battery lasts longer. In this case, the battery may last many years. Using these types of mechanisms we can achieve FIPS 140 level 1 and 2.

Example of How the System is Used.

The normal operation of the application is simple. First, the user connects the device using the personal computer and a pen drive, including means so that it automatically identifies its capabilities. Then, with the device identified, the user, via Web establishes the type of action he wishes to carry out for example, he carries out a bank transfer via the Web (logically this functionality is enabled). Once the biometric identification has been selected, the user in the device itself will carry out a scanning of said biometric characteristic, which is sent to the authorization centre (connected at this time with the bank and the user) to confirm that indeed it is that person and that biometric characteristic. In this practical example, once the authorization is received from the remote data centre, direct communications are established between the user and the bank.

More specifically, the data and communications interaction process is as follows, where $N_i$ denotes the message $M_i$ control number and the server is a data authentication centre:

i. In this biometric data example, the PC sends the message M1 to the Server with N1 and fingerprint. The fingerprint along with the operation is sent in this message.

ii. The Server sends M2 to the PC and, in the information that follows the header, N1. This way, the PC has fingerprint reception confirmation by an authorized board (the server's), since it is going to obtain N1.

iii. The PC sends M3 to the Server with N3 in the information that follows the header, N2. Now, the Server checks that M1 is not a repeated message inside the time window since it obtains N2.

iv. The Server will carry out the matching and will send M4 to the PC with AC acceptance of the operation and with N3 in the information that follows the header. The acceptance of the operation occurs as a consequence of the device recovering N3. The corresponding indicator light illuminates (led or other item) in the USB indicating that the operation has been accepted.

This way, the hardware accepts the operation and avoids the malicious software in the PC that may falsely say that the operation has been accepted.

The invention claimed is:

1. System for conducting remote biometric operations that includes a biometric data reading device connected to a personal computer and configured to send said encrypted biometric data to a remote data authentication centre for establishing a secure communications channel once user identity has been verified via said biometric data; the system comprising:

(a) a biometric acquisition means comprising a biometric sensor and a controller;

(b) a life detection means comprising a pulse detector;

(c) a signal processing and hardware encryption unit adapted to encrypt and decrypt a biometric signal, the signal processing and hardware encryption unit comprising:

an internal memory adapted to store at least a table of randomly generated m keys; and a Linear Feedback Shift Register (LFSR) adapted to route sequences of said table of keys, which vary with time in order to determine a selected key using a routing descriptor, configured by an LFSR circuit of k stages, with 2k being equal or greater than m, wherein said LFSR circuit is determined by a primitive polynomial A of order k, and a filter B of order j defined by a Boolean function with output numbers between 1 and m, being $j \leq \log2(m)$;

wherein the signal processing and hardware encryption unit is adapted to: generate a random seed to define an initial state of the routing descriptor; execute an encryption/decryption algorithm of said seed and of a message, wherein said algorithm includes an XOR bit to bit operation with said key selected in order to generate an encrypted/non encrypted message; and encrypt or decrypt the random seed and the message that contains digital information in different manners throughout time;

(d) a physical security means comprising micro switches used for detecting torsion or manipulation of the device; and (e) an external memory adapted to communicate with the signal processing and hardware encryption unit.

2. System in accordance with claim 1 wherein the physical security means is formed by flooding internal electronics of the device with an epoxy resin that solidifies, the micro-switches being adapted to detect if the device is being manipulated by pressure exerted by torsion of the solidified epoxy; and wherein a lithium battery is adapted to feed a security circuit of the physical security means to disable a central chip in case of an attack; and wherein an activation circuit related with the micro-switches enables destruction of information on the device in "low" so that the battery will last longer.

3. Remote biometric operations method implemented in the system of claim 1 wherein the data and communication interaction process includes the following steps, wherein Ni denotes the control number of messages M and a server is a data authentication centre:

i. a PC sends message M1 to the server with N1 and the biometric data;

ii. the server sends M2 to the PC with N2 and, in information that follows a header, N1; in such a manner that the PC has biometric data reception confirmation from the authorized biometric detection device, since it is going to obtain N1;

iii. the PC sends M3 to the server with N3 and, in information that follows the header, N2; the server checks that M1 is not a repeat message inside a time window since it obtains N2; and wherein the server carries out matching and sends M4 to the PC with AC acceptance of the operation and with N3 in information that follows the header; and wherein acceptance of operation occurs as a consequence of the device recovering N3.

4. System in accordance with claim 1 wherein the life detection means further comprises an oximeter detector.

5. System in accordance with claim 1 wherein the life detection means further comprises a thermopile.

6. System in accordance with claim 1 wherein the life detection means further comprises a sensor module, a wide band filtering module adapted to filter a frequency from about 0.1 to about 20 Hz, a signal amplifier module with a gain from about 100 and about 1000, and control and signal adaptation logic.

7. System in accordance with claim 1 wherein the external memory adapted to communicate with the signal processing and hardware encryption unit using an I2C protocol.

8. System in accordance with claim 1 wherein the external memory is adapted to be controlled by the signal processing and hardware encryption unit.

* * * * *